US012772016B2

(12) United States Patent
Frey

(10) Patent No.: US 12,772,016 B2
(45) Date of Patent: Oct. 20, 2026

(54) SOUND SIGNAL GENERATION CIRCUITRY AND SOUND SIGNAL GENERATION METHOD

(71) Applicant: Sony Group Corporation, Tokyo (JP)

(72) Inventor: Matthias Frey, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 216 days.

(21) Appl. No.: 17/696,891

(22) Filed: Mar. 17, 2022

(65) Prior Publication Data

US 2022/0312144 A1 Sep. 29, 2022

(30) Foreign Application Priority Data

Mar. 24, 2021 (EP) ..................................... 21164471

(51) Int. Cl.
*H04S 7/00* (2006.01)
*H04R 1/10* (2006.01)
*H04R 3/00* (2006.01)

(52) U.S. Cl.
CPC ............... *H04S 7/304* (2013.01); *H04R 1/10* (2013.01); *H04R 3/00* (2013.01)

(58) Field of Classification Search
CPC .......... H04R 1/10; H04R 1/1008; H04R 3/00; H04R 5/02; H04R 5/033; H04S 7/30; H04S 7/302; H04S 7/304; H04S 2400/11; H04S 2420/01
USPC ......................................... 381/310, 370, 376
See application file for complete search history.

(56) References Cited

U.S. PATENT DOCUMENTS 9,615,190 B1 * 4/2017 Norris .................. H04M 3/568
2008/0280730 A1 * 11/2008 Alexanderson ....... H04M 1/725 482/3
2010/0302015 A1 * 12/2010 Kipman ................. A63F 13/42 340/407.1
2014/0133658 A1 * 5/2014 Mentz ..................... H04S 7/304 381/1
2018/0048976 A1 * 2/2018 Kimura .................. H04S 7/303
2019/0320282 A1 10/2019 Moeller
2020/0053498 A1 2/2020 Kimura et al.
2021/0076152 A1 * 3/2021 Leppänen .............. H04S 3/008

FOREIGN PATENT DOCUMENTS

CH 706680 A2 * 12/2013 ............ A63B 71/04

* cited by examiner

*Primary Examiner* — Ahmad F. Matar
*Assistant Examiner* — Sabrina Diaz
(74) *Attorney, Agent, or Firm* — XSENSUS, LLP

(57) ABSTRACT

The present disclosure generally pertains to sound signal generation circuitry, configured to:

obtain a position of a virtual user and sound of the virtual user, the virtual user representing a training partner of a real user; and generate, based on the position of the virtual user and the sound of the virtual user, a control signal for at least two loudspeakers positioned in a real space, such that the at least two loudspeakers generate sound representing the virtual user at a predetermined position relative to the real user in the real space.

18 Claims, 3 Drawing Sheets

SOUND SIGNAL GENERATION CIRCUITRY AND SOUND SIGNAL GENERATION METHOD

CROSS-REFERENCE TO RELATED APPLICATION

The present application claims priority to European Patent Application No. 21164471.1, filed Mar. 24, 2021, the entire contents of which are incorporated herein by reference.

TECHNICAL FIELD

The present disclosure generally pertains to sound signal generation circuitry and a sound signal generation method for providing augmented reality sound.

TECHNICAL BACKGROUND

Generally, augmented reality applications are known.

For example, sports application may visualize virtual training partners to mock a group training or the like. Such applications may be known for running, (indoor) cycling, golf, tennis, or the like.

Moreover, approaches are known in which a sound source is generated to be perceived at a predetermined position other than actual physical sound sources (e.g. sound bars), such as wavefield synthesis, ambisonics, or the like (which will be discussed further below).

Although there exist techniques for augmenting reality with respect to training applications, it is generally desirable to provide sound signal generation circuitry and a sound signal generation method.

SUMMARY

According to a first aspect, the disclosure provides sound signal generation circuitry, configured to:

- obtain a position of a virtual user and sound of the virtual user, the virtual user representing a training partner of a real user; and
- generate, based on the position of the virtual user and the sound of the virtual user, a control signal for at least two loudspeakers positioned in a real space, such that the at least two loudspeakers generate sound representing the virtual user at a predetermined position relative to the real user in the real space.

According to a second aspect, the disclosure provides a sound signal generation method, comprising:

- obtaining a position of a virtual user and sound of the virtual user, the virtual user representing a training partner of a real user; and
- generating, based on the position of the virtual user and the sound of the virtual user, a control signal for at least two loudspeakers positioned in a real space, such that the at least two loudspeakers generate sound representing the virtual user at a predetermined position relative to the real user in the real space.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
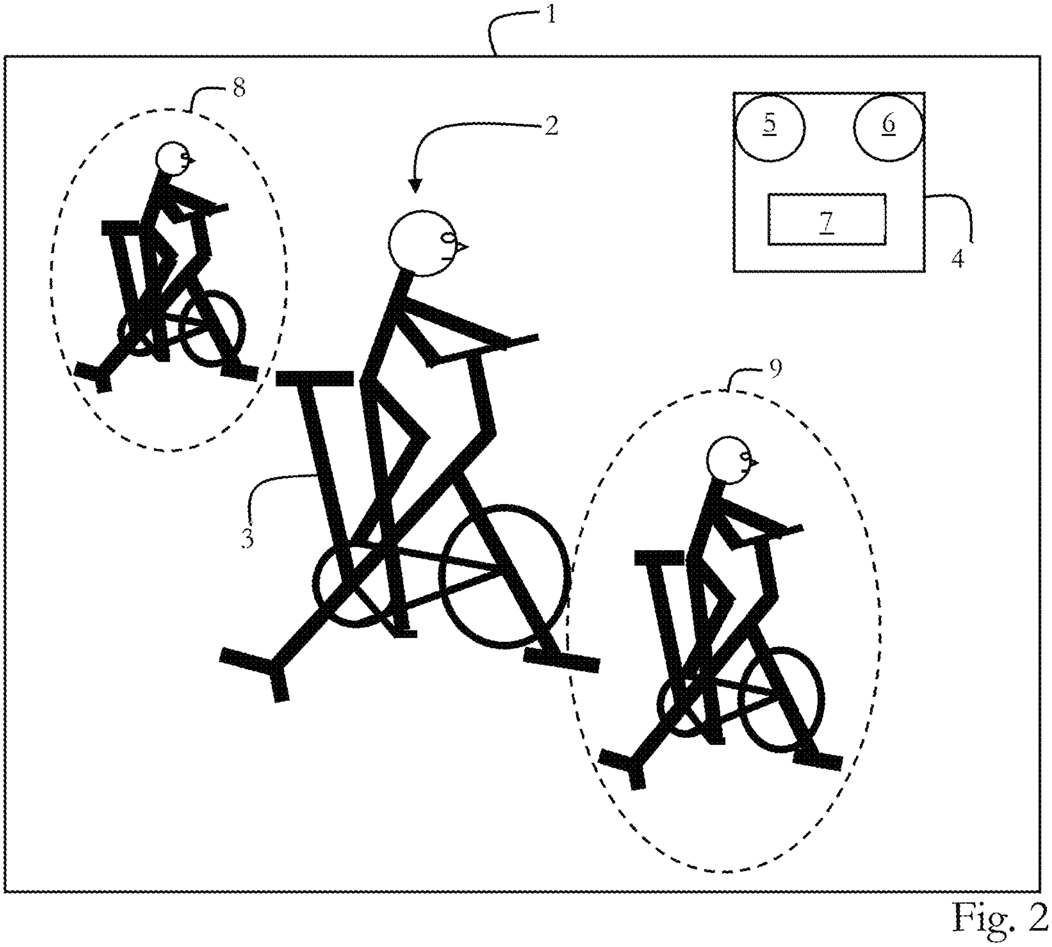
FIG. 2 depicts a real user on an exercise bike with two virtual training partners generated as sound signals at predetermined positions relative to the real user based on sound signal generation circuitry according to the present disclosure.

Before a detailed description of the embodiments starting with FIG. 2 is given, general explanations are made.

Although the present disclosure is not limited to the case of 3D audio rendering operations, in some embodiments, 3D audio rendering operations may be carried out, e.g., based on wavefield synthesis. Such 3D audio rendering operations are discussed in the following before a detailed description of the embodiments of the present disclosure is given.

As mentioned above, wavefield synthesis may be utilized for carrying out the technology according to the present disclosure. Wavefield synthesis may be used to generate a sound field that gives the impression that an audio (point) source is located inside a predefined space or at a predetermined position. Such an impression may be achieved for driving a loudspeaker array (e.g. at least two loudspeakers), such that the impression of a virtual sound source is generated.

In some embodiments, the 3D audio rendering operation may be based on monopole synthesis.

The theoretical background of this technique, which is used in some embodiments, is described in more detail in patent application US 2016/0037282 A1 that is herewith incorporated by reference.

The technique, which is implemented in the embodiments of US 2016/0037282 A1 is conceptually similar to the wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

According to some embodiments, the virtual sound source has a directivity pattern. For instance, directivity is achieved by superimposing multiple monopoles, wherein the directivity may describe a change of a speaker's frequency response at off axis angles.

The controlling of the loudspeaker arrangement or array (i.e. the at least two loudspeakers) may have the result that at least one individual loudspeaker of the loudspeaker arrangement emits a sound (or sound signal or sound wave as also used in some instances). The sound may be emitted instantaneously after the loudspeaker receives, e.g. a control signal or at a predetermined point of time. The predetermined point of time may in this context be part of the signal or part of an intrinsic programming of the at least one individual loudspeaker.

The generation of at least one virtual sound source may be based on a soundfield synthesis technology, as discussed above. The virtual sound source may be a soundfield, for example, which gives the impression that a sound source is located in a predefined space or at a predetermined position in a predefined (real) space. For instance, the use of virtual sound sources may allow the generation of spatially limited audio signal. The generation of a virtual sound source may be considered as a form of generation of a virtual loudspeaker throughout the three-dimensional space, including, e.g., behind, above, or below the listener or user.

The contribution of the at least one virtual loudspeaker and the at least one real loudspeaker may be at least one sound signal which is emitted by the corresponding loudspeakers. Moreover, in case there is a plurality of virtual loudspeakers and real loudspeakers, only a subset of the plurality of virtual loudspeakers and/or of the real loudspeakers may contribute to the generation of the virtual sound source, wherein a subset may also be zero, i.e. the virtual sound source may only be generated by the real loudspeakers, or the like.

In some embodiments, a soundfield modulation function is used, which may include any function influencing parameters of the soundfield, such as amplitude, frequency, phase, wave number, gain, phase, or the like. It may be a function transmitted by electric signals or an acoustic signal leading to an interference of the acoustic signal and the generated soundfield. For instance, the soundfield modulation function may modulate physical parameters of a signal to generate the impression of a listener that a generated sound originates from another direction than it actually does. For example, if the position of a virtual sound source is in front of a listener, applying a soundfield modulation function may result in the acoustic perception of the listener that the sound originates from a predetermined position, such as above, below or behind the listener, or the like (although there is no (real) loudspeaker located there).

In some embodiments the soundfield modulation function may include a head related transfer function (HRTF), which may simulate the complex filtering effect of a pinna, wherein, for simplification, in some embodiments, artificial pinnae are used in order to create the HRTF. The HRTF is known per se. Moreover, in some embodiments, the HRTF is obtained/created by measuring the filtering of a pinna (and in some embodiments remaining parts of a head) of an individual user or by averaging over a plurality of HRTFs of a plurality of users. Also, an artificial (dummy) head including at least one artificial pinna may be used to obtain the HRTF in one or a plurality of measurements. The HRTF may be obtained based on at least one of creating a three-dimensional model of a pinna, a computer simulation, a trial-and-error method, or the like.

In some embodiments, for simplifying the HRTF, finite impulse response (FIR) quotient filters may be applied to a virtual sound source in order to create perception of height.

Figure 1:
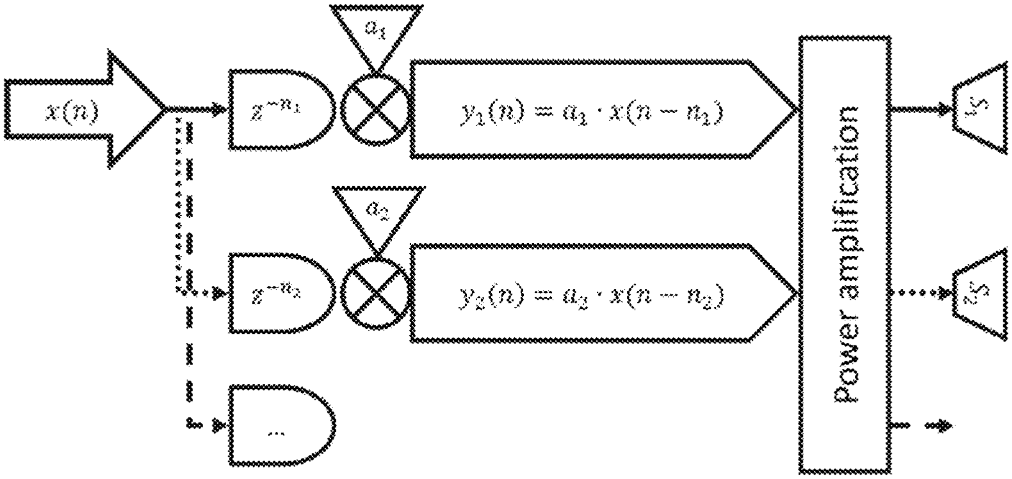
FIG. 1 is a schematic illustration of a Monopole Synthesis algorithm.

In some embodiments, a 3D audio rendering is implemented which is based on a digitalized Monopole Synthesis algorithm, which is discussed under reference of FIG. 1 in the following.

The theoretical background of this technique, which is used in some embodiments, is described in more detail in patent application US 2016/0037282 A1 that is herewith incorporated by reference.

The technique, which is implemented in the embodiments of US 2016/0037282 A1 is conceptually similar to the wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancellation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where $p=1, \ldots, N$ is the index of the respective synthesis monopole used for synthesizing the target monopole signal. The delay and amplification units according to this embodiment may apply equation (117) of reference US 2016/0037282 A1 to compute the resulting signals $y_p(n)=s_p(n)$ which are used to synthesize the target monopole signal. The resulting signals $s_p(n)$ are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{p0}}$$

is inversely proportional to the distance $r=R_{p0}$.

In alternative embodiments of the system, the modified amplification factor according to equation (118) of reference US 2016/0037282 A1 can be used.

Moreover, technologies which are known from the MPEG-H standard may be used in order to generate sound according to the present disclosure (see e.g. the following URL: pub.dega-akustik.de/DAGA_2015/data/articles/000515.pdf).

The MPEG-H standard may provide an audio codec for providing a three-dimensional sound (3D sound) based on different sound input formats, such as channel-based audio, object-based audio, higher order ambisonics, or combinations thereof.

Based on monopole synthesis and/or the MPEG-H standard (or different techniques), at least two loudspeakers (which may be included in a common casing or in different casings, such that they may be provided in a (common) sound box or being placed at different positions in an environment) may be controlled to generate 3D sound, as will be discussed further below.

As mentioned in the outset, augmented reality sports applications are generally known.

However, such applications may be unrealistic with respect to their presentation of sound.

For example, in running application (e.g. for smartphones), virtual users may not be auditorily perceived at positions in which they are visually placed to be (e.g. in a virtual or augmented reality space).

It may be similar for home sports devices or applications which allow the user to train with or compete against friends or other training partners since the training partners may not seem to be close by or even in the same room.

Hence, it has been recognized that based on spatial audio techniques or ultrasonic audio techniques, or the like, a user experience and a usability of such applications can be made more realistic, immersive, and engaging. It has further been recognized that sound of a training partner or any other virtual user can be generated to be in a real space (e.g. at a fixed spot or at different spots in a room (e.g. if the training partner is moving)), even when a real user is moving and/or turning his or her head in the real space.

Therefore, some embodiments pertain to sound signal generation circuitry, configured to: obtain a position of a virtual user and sound of the virtual user, the virtual user representing a training partner of a real user; and generate, based on the position of the virtual user and the sound of the virtual user, a control signal for at least two loudspeakers positioned in a real space, such that the at least two loudspeakers generate sound representing the virtual user at a predetermined position relative to the real user in the real space.

Circuitry may pertain to any entity or multitude of entities being capable of carrying out data processing techniques, as discussed herein, such as a CPU (central processing unit), GPU (graphics processing unit), FPGA (field-programmable gate array), or the like. The sound signal generation circuitry according to the present disclosure may further include or be applied to an apparatus which is suitable for controlling a sound of a loudspeaker arrangement, such as a processor, an amplifier, such as an electronic amplifier, a unilateral amplifier, bilateral amplifier, inverting amplifier, non-inverting amplifier, a servo amplifier, a linear amplifier, a non-linear amplifier, a wideband amplifier, a radio frequency amplifier, an audio amplifier, resistive-capacitive coupled amplifier (RC), inductive-capacitive coupled amplifier (LC), transformer coupled amplifier, direct coupled amplifier, or the like. Moreover, the sound signal generation circuitry may be applied to a 3D audio rendering system, such as ambisonics, wavefield synthesis systems, surround sound systems, 360 RA (or any other spatial audio speaker(s)), or the like, including at least two loudspeakers, such that a sound can be generated which can be perceived to be at a predetermined position relative to the real user.

A loudspeaker may pertain to circuitry configured to generate sound, such as a transducer (and corresponding control circuitry, for example). Thus, multiple loudspeaker (i.e. at least two) may be provided separately of each other (e.g. in single casings and thus may be placed at different positions) or together (e.g. in a common casing, such that relative positions of the loudspeakers with respect to each other is intrinsically known), such as in a sound box, sound bar, or the like, having at least two transducers.

In some embodiments, a position of the virtual user and a sound of the virtual user is obtained. For example, the virtual user may be a further (or second) real user (e.g. a remote user with respect to the first real user), such that at least one of the position or the sound of the virtual user may be acquired based on real user data. In such embodiments, virtual may relate to the second user being virtually in the real space or in an environment of the first real user, whereas the virtual user may be in another real space or environment (e.g. in another room or house, or the like).

For example, the sound of the virtual user may be transmitted directly to the real user, such that a training of the real user and the virtual user can happen at the same time (with corresponding transmission and processing delays).

In another example, the virtual user is a simulated user, such that the position and the sound of the virtual user are simulated.

In some embodiments, virtual user data is simulated based on real user data. For example, real user data may be used for training an artificial intelligence for simulating a virtual user.

The virtual user may represent a training partner of the real user. For example, if the real user is doing sports (or any other training, such as learning), the virtual user may be virtually positioned in the real space of the user doing the same or a similar training.

For example, if the real user is running or riding a bike, the sound of virtual user may be represented in proximity to the real user, such that the real user has an impression of running together with the virtual user.

However, if the virtual user is based on a remote real user, the position of the virtual user does not necessarily need to be the same position as the remote user has in his own reference system. For the real user to perceive the virtual user at a predetermined position relative to the real user, the position of the virtual user may be transformed, e.g. based on a coordinate transform, or the like into a local position with respect to the real user intended to perceive the sound of the virtual training partner.

For example, if the real user and the virtual user are running (as a training) and it is determined that the virtual user runs slower than the real user, the real user, the position of the virtual user may be determined, based on a pace or speed of the virtual user, to be behind the real user without exactly determining the predetermined position of the virtual user relative to the real user.

Hence, based on the position and the sound of the virtual user, a control signal for at least two loudspeakers positioned in a real space is generated.

However, the present disclosure is not limited to any specific type of activity or sports, as discussed herein. For example, indoor cycling or other (roughly) static sports may be envisaged (e.g. chess, or the like), but the present disclosure may also be applied to interactive or dynamic activities, such as tennis, table-tennis, (indoor or outdoor) golf, or the like.

In the case of partner sports (e.g. tennis) with both users as real users (i.e. the real user and a remote real user being displayed as a virtual user for the real user and vice versa) may be tracked, for example, e.g. with a camera, or the like, as discussed herein.

As indicated herein, in a case of a roughly static activity, such as learning, chess, indoor cycling, or the like, user tracking may not be necessary in every case, but may be envisaged, if needed, whereas user tracking may be envisaged in case of dynamic sports, in which users are moving (e.g. tennis).

The real space may include an environment of the real user, such as a room or an outside environment which may be based on the training the real user carries out.

Depending on a type of loudspeakers, it may be necessary to determine a structure or other properties (e.g. acoustic properties) of the real space or the environment. For example, in a case of sound boxes or sound bars, which may be positioned in a room, the room may be acoustically measured, such that the sound of the virtual user is positioned at the predetermined position.

Furthermore, a visual detection system (e.g. a camera or a movement sensor) may be used to determine or track a position of the real user for generating the sound.

If the loudspeakers are headphones (or earphones), it may not be necessary to determine a structure or properties of the real space or the environment, since it may be sufficient to determine properties of the real user's head or pinnae, as discussed above (although the user's head or pinnae may also be defined as "real space" in some instances).

For example, if headphones or earphones are used, one or multiple IMUs (inertia measurement units) may be associated with or integrated in the headphones/earphones, such that a head movement may further be determined, such that a relative position of the virtual user may further be adjusted, without limiting the present disclosure in that regard.

The control signal may be an electric signal, a wireless signal (e.g. WiFi, Bluetooth, or the like), or the like, including a signal sequence which can be transmitted to the at least two loudspeakers positioned in the real space.

Positioning may refer to a placement of the loudspeakers, wherein coordinates of the loudspeakers with respect to the real space or relative to the user can be determined. The coordinates do not explicitly need to be known, but it may be sufficient that properties are known which in theory could be indicative of the coordinates.

For example, in the case of sound boxes or sound bars, a calibration may be carried out, as it is generally known to determine acoustic properties of a room without explicitly determining coordinates. In the case of headphones, a position of the headphones with respect to the user's head may be determined based on a similar calibration (e.g. for determining an HRTF).

In some embodiments, the position of the virtual user and the sound of the virtual user are based on simulated data, as discussed herein.

In some embodiments, at least one of the position of the virtual user and the sound of the virtual user is based on real data, as discussed herein.

For example, the sound may be based on a real sound of the virtual user (as a second real user), wherein the position may be simulated, or vice versa, or both the position and the sound may be based on real data.

In some embodiments, if the position is based on real data, the position is acquired by a camera directed towards a further real user representing the virtual user.

The camera is not limited to a specific type of camera, such that an RGB (red, green, blue) camera, a multispectral camera, a TOF (time-of-flight) camera, or the like may be used, which may be based on known semiconductor technologies (e.g. CMOS (complementary metal oxide semiconductor), CCD (charge coupled device), or the like). Moreover, a stereo camera (e.g. two RGB cameras) or a hybrid camera (e.g. RGB combined with TOF) may be used, such that a position and/or a depth of the virtual user (in some embodiments, including a surrounding of the virtual user) may be determined more exactly.

The position may alternatively or additionally acquired based on other techniques, such as WiFi backscattering, based on an RFID (radio frequency identification) tracker, or based on any other electrical field tracking technique or radio frequency tracking technique, such as WiFi tracking, Zigbee, UWB (ultra wide-band) tracking, infrared tracking (e.g. based on PIR (pyroelectric infrared)). Additionally or alternatively, tracking may be carried out based on acoustics and/or vibrational recognition or determination. Other tracking techniques, e.g. for multi-resident environment tracking may be envisaged, which may be known, for example from the scientific publication "A survey on Device-free Indoor Localization and Tracking in the Multi-resident Environment", as published on https://doi.org/10.1145/3396302.

In some embodiments, if the sound is based on real data, the sound is acquired from the further real user, as discussed herein.

Generally, the sound may be based on a direct transmission of the sound or may be recorded, as it is generally known.

In some embodiments, the sound is generated based on a calibration of the at least two loudspeakers with respect to the real space, as discussed herein.

In some embodiments, the at least two loudspeakers are headphones, as discussed herein.

In some embodiments, the sound is generated based on a head-related transfer function of the real user, as discussed herein.

In some embodiments, the control signal is generated based on a movement of the real user.

For example, during training of the real user, a head position may change more or less depending on a type of training.

If the movement of the real user includes running, the real user's body posture and position may vary during the training. Thereby, also the position of the real user's head may change in height (e.g. in absolute height or with respect to a body axis).

Additionally, if the virtual user runs at a different pace and/or at a different frequency than the real user, the virtual user's body posture and position may vary differently than the real user's body posture and position.

Moreover, if the real user turns his or her head, the sound of the virtual user should not change with respect to the real user's position.

Hence, to make the sound of the virtual user more realistic for the real user, in some embodiments, the sound signal generation is further configured to: obtain a head position of the real user for generating the control signal.

As discussed above, the head position may include a head height, a lateral position, a degree of head inclination and head twist.

Some embodiments pertain to a sound signal generation method, including: obtaining a position of a virtual user and sound of the virtual user, the virtual user representing a training partner of a real user; and generating, based on the position of the virtual user and the sound of the virtual user, a control signal for at least two loudspeakers positioned in a real space, such that the at least two loudspeakers generate sound representing the virtual user at a predetermined position relative to the real user in the real space, as discussed herein.

The sound signal generation method may be carried out with sound signal generation circuitry according to the present disclosure.

In some embodiments, at least one of the position of the virtual user and the sound of the virtual user is based on simulated data, as discussed herein. In some embodiments, at least one of the position of the virtual user and the sound of the virtual user is based on real data, as discussed herein. In some embodiments, if the position is based on real data, the position is acquired by a camera directed towards a further real user representing the virtual user, as discussed herein. In some embodiments, if the sound is based on real data, the sound is acquired from the further real user, as discussed herein. In some embodiments, the sound is generated based on a calibration of the at least two loudspeakers with respect to the real space, as discussed herein. In some embodiments, the at least two loudspeakers are headphones, as discussed herein. In some embodiments, the sound is generated based on a head-related transfer function of the real user, as discussed herein. In some embodiments, the sound is generated based on a movement of the real user, as discussed herein. In some embodiments, the sound signal generation method further includes: obtaining a head position of the real user for generating the control signal, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, there is depicted a room 1 in which a real user 2 is training on an exercise bike 3. Moreover, a sound box 4 is positioned in the room 1, wherein the sound box 4 includes two loudspeakers 5 and 6 and sound signal generation circuitry 7 according to the present disclosure.

The sound signal generation circuitry 7 is configured to generate a control signal for the loudspeakers 5 and 6 to generate sound representing two virtual users 8 (on the left of the real user 2) and 9 (on the right of the real user 2) which train on respective exercise bikes at predetermined positions relative to the real user in the room 1.

The sound signal generation circuitry 7 generates the control signal for the loudspeakers based on positions and sound of the virtual user 8 and 9. In this embodiment, the virtual users 8 and 9 are remote real users such that a movement and position of the virtual users 8 and 9 is tracked via a camera and the sound of the virtual users 8 and 9 is recorded with microphones.

In this embodiment, there is no need to track the users visually since their position may remain roughly the same (i.e. may be static).

Furthermore, as discussed above, in some embodiments, there is no need to use a sound box, such as the sound box 4 of FIG. 2, since headphones may be utilized, wherein the virtual training partners are placed in the real space based on an HRTF of the real user.

Such an approach may also be envisaged when a user is running outside and thereby may have up to six degrees of freedom (6DOF) since there may be no sound box present (if the user is running on a treadmill, a sound box may also be envisaged since the user is roughly stationary). Hence, based on the real user's movement and/or the virtual user's movement, which may be measured e.g. by at least one of an IMU or GPS (global positioning system) (or any other positioning method, e.g. based on GNSS (global navigation satellite system), e.g. by a terminal device of the real user), sound of the virtual user may be generated to be perceived by the real user as deriving from a predetermined position relative to the real user, as discussed herein.

Figure 3:
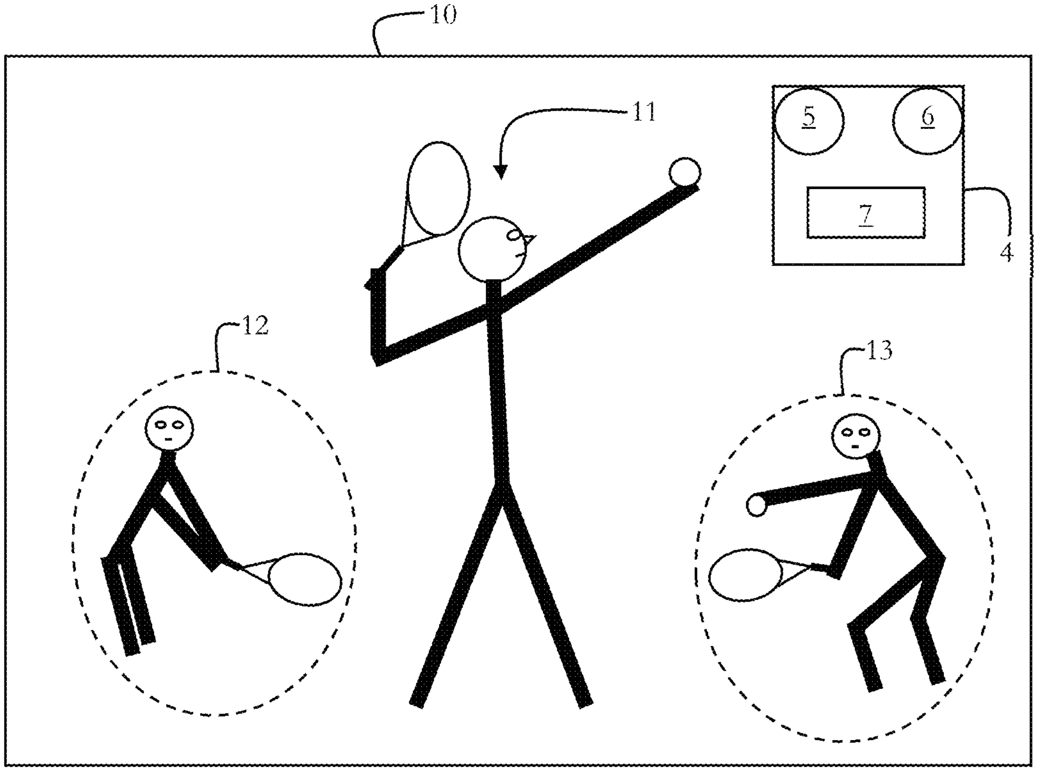
FIG. 3 depicts a real user playing tennis with two virtual training partners generated as sound signals at predetermined positions relative to the real user based on sound signal generation circuitry according to the present disclosure.

FIG. 3 depicts a room 10 with a real user 11 who is playing tennis.

Moreover, the sound box 4, as discussed under reference of FIG. 2 is positioned in the room, such that two virtual users (or training partners) 12 and 13 are generated at a predetermined position with respect to the user.

The virtual user 12 is a remote real user, such that the sound of the virtual user 12 is generated based on real data, whereas the virtual user 13 is a simulated user, such that the sound of the virtual user 13 is generated based on simulated data.

The virtual user 12 is a tennis partner of the real user 11, and the virtual user is a (simulated) tennis opponent. A tennis racquet of the real user 11 (and/or the virtual user 12) is tracked by IMUs (inertia measurement units) and a camera, in this embodiment (although, in some embodiments, it may be sufficient to only use an IMU or a camera). In some embodiments, to increase a realism of a tennis match, sound of a cheering audience can be generated based on a sound signal generation method according to the present disclosure.

If a camera is used for tracking the real user's movement (or the tennis racquet), such a camera may be placed on a screen, for example, wherein the screen may depict the respective tennis match, which is taking place, as it is generally known.

Figure 4:
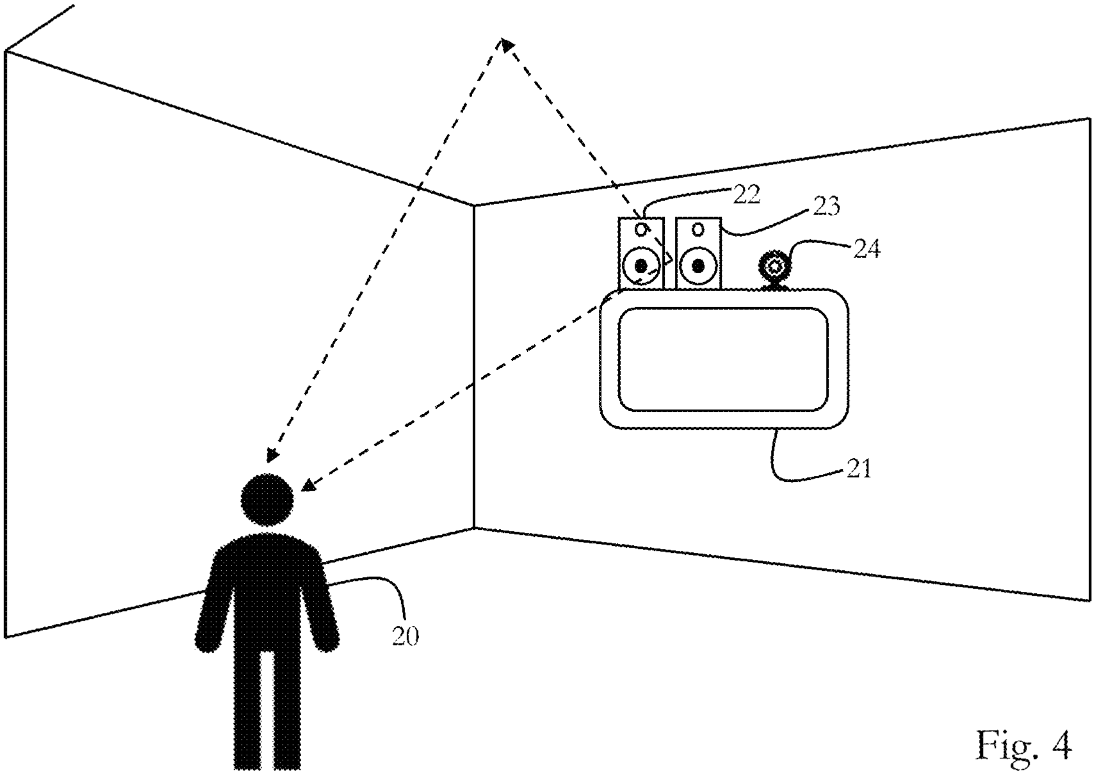
FIG. 4 depicts an embodiment in which ultrasonic speakers are used to generate a sound at a predetermined position relative to a real user, wherein the position of the real user is further tracked with a camera.

FIG. 4 depicts a further embodiment of the present disclosure in which a real user 20 is placed in a room, wherein a television 21 is also present. Above the television 21, two loudspeakers 22 and 23 are positioned, and a camera 24 on top of the television 21 determines the position of the real user 20, such that sound of a virtual user can be placed with respect to the real user 20.

The loudspeakers 22 and 23 are, based on a control signal of sound signal generation circuitry (not depicted), configured to place sound at a predetermined position (indicated with dashed arrows) based on ultrasonic sound technology, such that the real user 20 has a three dimensional sound perception.

Generally, the ultrasonic loudspeakers 22 and 23 may project sound via both ways depicted in FIG. 4 or only via one way (i.e. either ceiling reflection (or wall reflection) or via a direct way) to the real user 20.

The speakers 22 and 23 can be moved physically, in some embodiments, but in this embodiment, the speakers 22 and 23 apply beamforming to ultrasonic transducers, as it is generally known, such that sound is projected onto a predetermined position (as displayed in FIG. 4: onto the real user 20).

Figure 5:
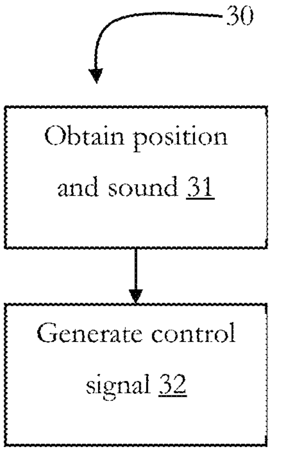
FIG. 5 depicts an embodiment of a sound signal generation method according to the present disclosure in a block diagram.

FIG. 5 depicts a block diagram of a sound signal generation method 30 according to the present disclosure.

At 31, a position of a virtual user and sound of the virtual user is obtained, wherein the virtual user is a training partner of a real user. The position and sound are obtained based on simulated data, i.e. the virtual user is a simulated user.

At 32, a control signal is generated based on the position and sound of the virtual user, for a loudspeaker arrangement including three loudspeakers positioned in a room in which the real user is present. The loudspeaker arrangement is a spatial audio system which is configured to generate sound, based on the control signal, representing the virtual user at a predetermined position relative to the real user in the real space.

Figure 6:
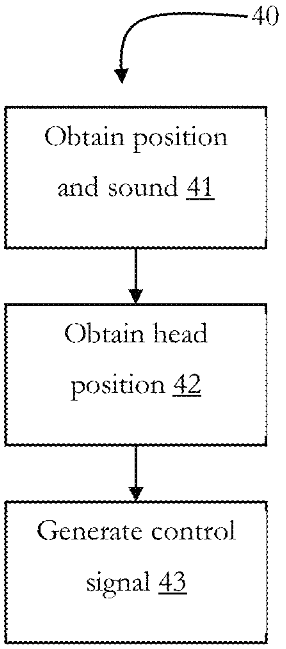
FIG. 6 depicts an embodiment of a sound signal generation method according to the present disclosure in a block diagram.

FIG. 6 depicts a block diagram of a further embodiment of a sound signal generation method 40 according to the present disclosure.

At 41 a position of a virtual user and sound of the virtual user are obtained, wherein the virtual user is a training partner of a real user. The position and sound are obtained based on real data, i.e. the virtual user is a remote real user.

The real user and the virtual user are both running as a training, such that the head position of the real user varies. The real user wears headphones including multiple IMUs to track a head position.

Hence, at 42, a head position of the real user is obtained for generating the control signal, as discussed herein.

At 43, the control signal is generated based on the position of the virtual user, the sound of the virtual user, and the head position of the real user. Furthermore, an HRTF is used by the headphones by which the control signal is processed with, such that the headphones generate sound representing the virtual user at a predetermined position relative to the real user in the real space, as discussed herein.

It should be recognized that the embodiments describe methods with an exemplary ordering of method steps. The specific ordering of method steps is however given for illustrative purposes only and should not be construed as binding. For example, the ordering of 41 and 42 in the embodiment of FIG. 6 may be exchanged. Other changes of the ordering of method steps may be apparent to the skilled person.

Please note the present disclosure is not limited to any specific division of functions in specific units. For instance, the sound signal generation circuitry 7 control could be implemented by a respective programmed processor, field programmable gate array (FPGA) and the like.

In some embodiments, also a non-transitory computer-readable recording medium is provided that stores therein a computer program product, which, when executed by a processor, such as the processor described above, causes the method(s) described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Sound signal generation circuitry, configured to:

obtain a position of a virtual user and sound of the virtual user, the virtual user representing a training partner of a real user; and generate, based on the position of the virtual user and the sound of the virtual user, a control signal for at least two loudspeakers positioned in a real space, such that the at least two loudspeakers generate sound representing the virtual user at a predetermined position relative to the real user in the real space.

(2) The sound signal generation circuitry of (1), wherein the position of the virtual user and the sound of the virtual user are based on simulated data.

(3) The sound signal generation circuitry of (1), wherein at least one of the position of the virtual user and the sound of the virtual user is based on real data.

(4) The sound signal generation circuitry of (3), wherein, if the position is based on real data, the position is acquired by a camera directed towards a further real user representing the virtual user.

(5) The sound signal generation circuitry of (4), wherein, if the sound is based on real data, the sound is acquired from the further real user.

(6) The sound signal generation circuitry of anyone of (1) to (5), wherein the sound is generated based on a calibration of the at least two loudspeakers with respect to the real space.

(7) The sound signal generation circuitry of anyone of (1) to (6), wherein the at least two loudspeakers are headphones.

(8) The sound signal generation circuitry of (7) wherein the sound is generated based on a head-related transfer function of the real user.

(9) The sound signal generation circuitry of anyone of (1) to (8), wherein the control signal is generated based on a movement of the real user.

(10) The sound signal generation circuitry of (9), further configured to:

obtain a head position of the real user for generating the control signal.

(11) A sound signal generation method, comprising:

obtaining a position of a virtual user and sound of the virtual user, the virtual user representing a training partner of a real user; and generating, based on the position of the virtual user and the sound of the virtual user, a control signal for at least two loudspeakers positioned in a real space, such that the at least two loudspeakers generate sound representing the virtual user at a predetermined position relative to the real user in the real space.

(12) The sound signal generation method of (11), wherein at least one of the position of the virtual user and the sound of the virtual user is based on simulated data.

(13) The sound signal generation method of (11), wherein at least one of the position of the virtual user and the sound of the virtual user is based on real data.

(14) The sound signal generation method of (13), wherein, if the position is based on real data, the position is acquired by a camera directed towards a further real user representing the virtual user.

(15) The sound signal generation method of (14), wherein, if the sound is based on real data, the sound is acquired from the further real user.

(16) The sound signal generation method of anyone of (11) to (15), wherein the sound is generated based on a calibration of the at least two loudspeakers with respect to the real space.

(17) The sound signal generation method of anyone of (11) to (16), wherein the at least two loudspeakers are headphones.

(18) The sound signal generation method of (17), wherein the sound is generated based on a head-related transfer function of the real user.

(19) The sound signal generation method of anyone of (11) to (18), wherein the control signal is generated based on a movement of the real user.

(20) The sound signal generation method of (19), further comprising:

obtaining a head position of the real user for generating the control signal.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Sound signal generation circuitry, configured to:

obtain a position of a virtual user and sound of the virtual user, the virtual user representing a training partner of a real user; and generate, based on the position of the virtual user, the sound of the virtual user, and a head position of the real user, a control signal for at least two loudspeakers positioned in a real space, such that the at least two loudspeakers generate sound representing the virtual user at a predetermined position relative to the real user in the real space, wherein the head position of the real user includes at least a head height, the at least two loudspeakers are adjacent to each other and disposed in a same sound box that is fixed at a location spaced apart from the real user, the sound is generated to be perceived by the real user as originating from the predetermined position of the virtual user independent of head movement of the real user, the at least two loudspeakers include ultrasonic loudspeakers, and the control signal causes the ultrasonic loudspeakers to apply beamforming to project the sound via at least one of a ceiling reflection or a wall reflection to the real user.

2. The sound signal generation circuitry of claim 1, wherein the position of the virtual user and the sound of the virtual user are based on simulated data.

3. The sound signal generation circuitry of claim 1, wherein at least one of the position of the virtual user and the sound of the virtual user is based on real data.

4. The sound signal generation circuitry of claim 3, wherein, if the position is based on real data, the position is acquired by a camera directed towards a further real user representing the virtual user.

5. The sound signal generation circuitry of claim 4, wherein, if the sound is based on real data, the sound is acquired from the further real user.

6. The sound signal generation circuitry of claim 1, wherein the sound is generated based on a calibration of the at least two loudspeakers with respect to the real space.

7. The sound signal generation circuitry of claim 1, wherein the sound is generated based on a head-related transfer function of the real user.

8. The sound signal generation circuitry of claim 1, wherein the control signal is generated based on a movement of the real user.

9. The sound signal generation circuitry of claim 3, wherein if the position is based on real data, the position is acquired by at least one of radio frequency tracking or infrared tracking of the real user.

10. The sound signal generation circuitry of claim 4, wherein the camera includes one of a red-green-blue camera, a time-of-flight camera, a stereo camera, or a combination thereof.

11. A sound signal generation method, comprising:

obtaining a position of a virtual user and sound of the virtual user, the virtual user representing a training partner of a real user; and generating, based on the position of the virtual user, the sound of the virtual user, and a head position of the real user, a control signal for at least two loudspeakers positioned in a real space, such that the at least two loudspeakers generate sound representing the virtual user at a predetermined position relative to the real user in the real space, wherein the head position of the real user includes a head height, the at least two loudspeakers are adjacent to each other and disposed in a same sound box that is fixed at a location spaced apart from the real user, and the sound is generated to be perceived by the real user as originating from the predetermined position of the virtual user independent of head movement of the real user, the at least two loudspeakers include ultrasonic loudspeakers, and the control signal causes the ultrasonic loudspeakers to apply beamforming to project the sound via at least one of a ceiling reflection or a wall reflection to the real user.

12. The sound signal generation method of claim 11, wherein at least one of the position of the virtual user and the sound of the virtual user is based on simulated data.

13. The sound signal generation method of claim 11, wherein at least one of the position of the virtual user and the sound of the virtual user is based on real data.

14. The sound signal generation method of claim 13, wherein, if the position is based on real data, the position is acquired by a camera directed towards a further real user representing the virtual user.

15. The sound signal generation method of claim 14, wherein, if the sound is based on real data, the sound is acquired from the further real user.

16. The sound signal generation method of claim 11, wherein the sound is generated based on a calibration of the at least two loudspeakers with respect to the real space.

17. The sound signal generation method of claim 11, wherein the sound is generated based on a head-related transfer function of the real user.

18. The sound signal generation method of claim 11, wherein the control signal is generated based on a movement of the real user.

* * * * *